United States Patent [19]
Hooper

[11] Patent Number: 5,841,243
[45] Date of Patent: Nov. 24, 1998

[54] LOAD MATCHED EXCITATION CIRCUIT FOR AN ELECTRODELESS LAMP INCLUDING A FREQUENCY SWEPT RF EXCITATION SOURCE

[75] Inventor: Edward H. Hooper, Baltimore, Md.

[73] Assignee: Northrop Grumman Corporation, Los Angeles, Calif.

[21] Appl. No.: 863,052

[22] Filed: May 23, 1997

[51] Int. Cl.⁶ .................................................... H05B 37/02
[52] U.S. Cl. .......................... 315/248; 315/267; 315/344
[58] Field of Search .............................. 315/248, 39, 344, 315/283, 267, 338; 313/594, 634, 601

[56] References Cited

U.S. PATENT DOCUMENTS

| | | | |
|---|---|---|---|
| 5,306,987 | 4/1994 | Dakin et al. | 315/248 |
| 5,519,285 | 5/1996 | Ukegawa et al. | 313/594 |

*Primary Examiner*—Don Wong
*Assistant Examiner*—David H. Vu
*Attorney, Agent, or Firm*—Walter G. Sutcliff

[57] ABSTRACT

An excitation circuit for an electrodeless light bulb which includes an RF source, a driver amplifier, and a load matching network and where the frequency of the RF energy generated by the source is swept over a predetermined frequency range in a controlled manner by a programmable frequency controller to cover the entire range of possible load match tuning conditions so that the electrodeless bulb will be substantially matched at all times to the source at some frequency in the sweep range.

20 Claims, 1 Drawing Sheet

FIG.1
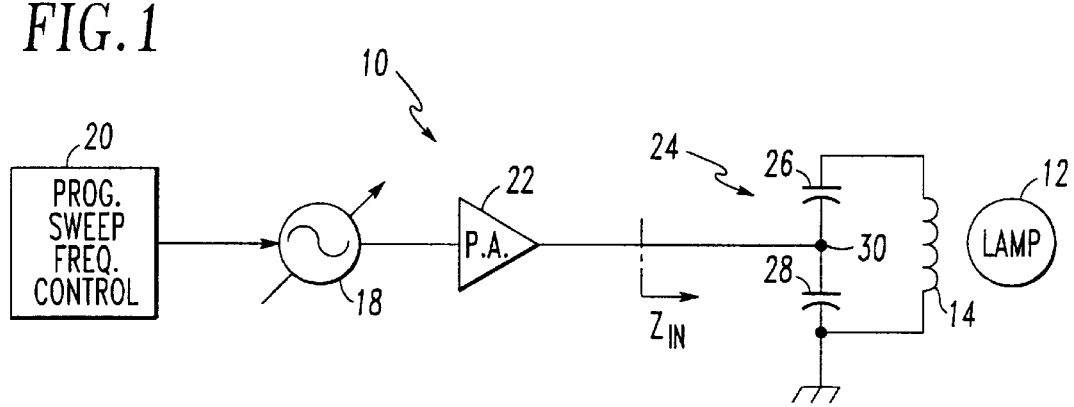
FIG.2
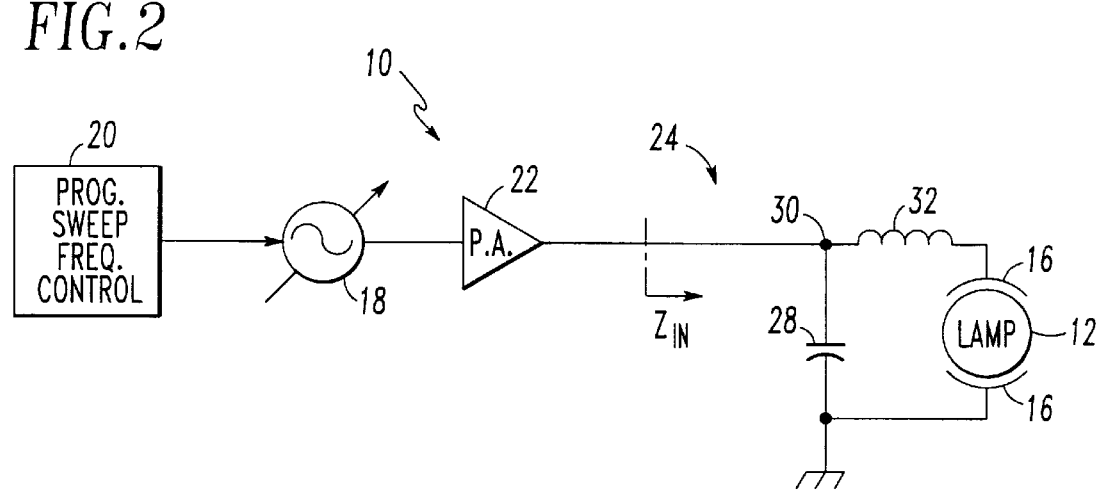
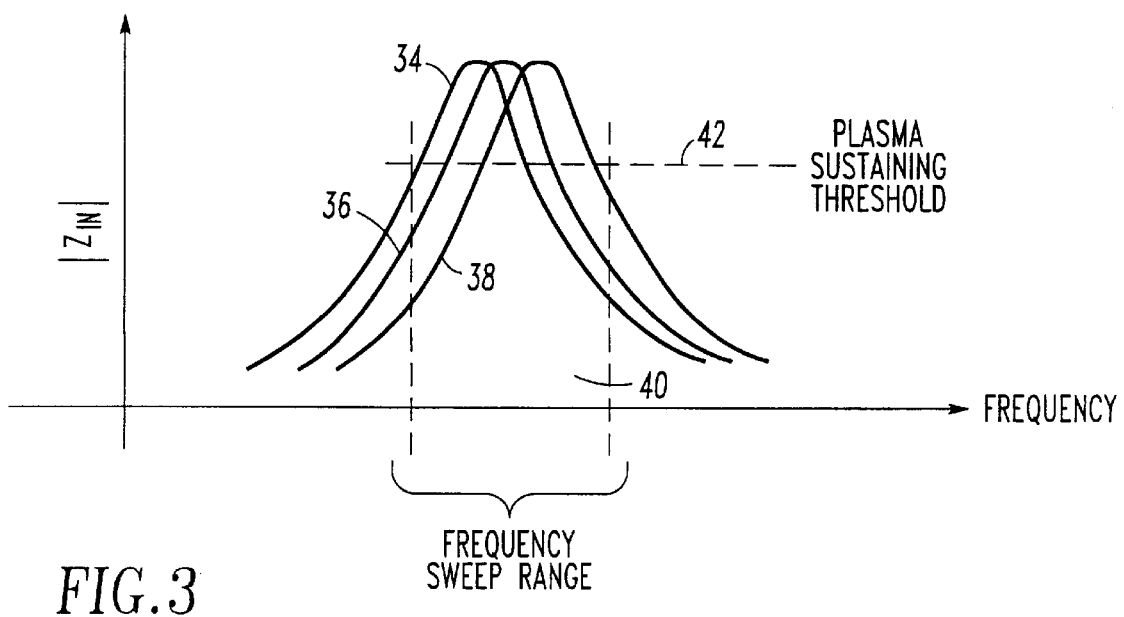
FIG.3

LOAD MATCHED EXCITATION CIRCUIT FOR AN ELECTRODELESS LAMP INCLUDING A FREQUENCY SWEPT RF EXCITATION SOURCE

BACKGROUND OF THE INVENTION

1. Field of the Invention

This invention relates generally to a method and apparatus for exciting a light source, and more particularly to a method and apparatus excitation circuitry for exciting a high intensity electrodeless light bulb.

2. Description of Related Art

In the field of electrodeless lamp technology, improvements are constantly being made on apparatus for generating high intensity light in a plasma generated and sustained by RF excitation. The lamp itself is generally well known and comprises a closed, transparent light bulb containing an inert gas and certain chemical elements. Typically, the gas is comprised of argon and the elements are selected from Group VI-A of the periodic table of elements, such as sulfur. As the material in the bulb is heated by a concentration of RF energy coupled thereto from a driver circuit, the inert gas is ionized and the elements contained therein are vaporized to form a high temperature plasma which emits high intensity light which is similar to bright sunlight.

As is well known, RF coupling to the bulb may be inductive through a coil wound about the bulb, capacitive through electrodes bracketing the bulb, or a combination of the two. Additionally, an RF source and an impedance matching circuit are required to optimally couple RF energy from the source to the bulb. The matching circuit is designed so as to exhibit low loss, high Q and a narrow bandwidth. Typically, the frequency of the RF signal exciting the bulb ranges from about 10 MHz to 100 MHz.

Since the effective resistance of the bulb and the impedance of the coupling device change with plasma temperature, the impedance match between the RF source and coupling device varies with plasma temperature. Since the matching circuit is normally comprised of discrete reactance elements forming thereby a tuned circuit matching the bulb to the RF source as loaded by the bulb, it has a relatively narrow bandwidth so that any significant shift in loading causes coupling to the bulb to move away from the optimum operating point which can result in cooling of the plasma and extinction of the lamp.

SUMMARY

Accordingly, it is an object of the present invention to provide an improvement in high intensity light sources.

It is another object of the invention to provide an improvement in the method and means used to excite a high intensity electrodeless light bulb.

It is a further object of the invention to provide improvement in the driver circuitry for exciting the high intensity electrodeless light bulb.

It is yet a further object of the invention to provide an improvement in the RF source included in the driver circuitry for exciting a high intensity electrodeless light bulb.

The foregoing and other objects of the invention are achieved by a method and excitation circuit for an electrodeless light bulb which includes an RF source, a driver amplifier, and a load matching network and where the frequency of the RF energy generated by the RF source is swept over a predetermined frequency range in a controlled manner to cover the entire range of possible load match tuning conditions so that the electrodeless bulb will be substantially matched at all times to the source at some frequency in the sweep range. This is due to the fact that the match point shifts as a function of lamp temperature, particularly during start up and temperature stabilizing conditions, resulting in the lamp being lighted by effectively being pulsed at a frequency that the lamp and its matching network desire to operate.

Further scope of applicability of the present invention will become apparent from the description provided hereinafter. It should be understood, however, that the detailed description and specific examples set forth herein, while disclosing preferred embodiments of the invention, are provided only by way of illustration, since various changes and modifications coming within the spirit and scope of the invention will become apparent to those skilled in the art from this detailed description.

BRIEF DESCRIPTION OF THE DRAWINGS

The present invention will become more fully understood from the detailed description provided hereinafter and the accompanying drawing which is provided by way of illustration only, and thus is not meant to be limitative of the invention, and wherein:

FIG. 1 is an electrical schematic diagram illustrative of a first preferred embodiment of the invention;

FIG. 2 is an electrical schematic diagram illustrative of a second preferred embodiment of the invention; and FIG. 3 is a set of characteristic curves helpful in understanding the operation of the subject invention.

DETAILED DESCRIPTION OF THE INVENTION

Referring now to the drawing wherein like reference numerals refer to like components throughout, reference numeral 10 denotes an excitation circuit for an electrodeless lamp of a known type consisting of a transparent light bulb 12 filled, for example, with a proprietary gas which when excited by an RF signal inductively coupled thereto as shown in FIG. 1 or capacitively coupled thereto as shown in FIG. 2, emits an intense light. By selectively choosing the elements of the gaseous mixture in the bulb 12, light similar to bright sunlight can be generated.

In FIG. 1, inductive coupling is achieved by means of an excitation coil 14 while capacitive coupling in FIG. 2 is achieved by plates of a capacitor 16, partially encircling the lamp 12. In both embodiments, RF energy is generated by an variable frequency RF source 18, which is coupled to and controlled by a programmable sweep frequency controller 20. The output of the RF source 18 is fed to an RF power amplifier 22 which is coupled to an impedance matching network 24.

The tuning characteristics of a typical lamp loaded impedance matching network 24 for either inductive or capacitive coupling to an electrodeless bulb 12 are similar in that the circuit is normally comprised of a combination of inductor (s) and capacitor(s). The reactance values are chosen to effectively tune out the reactance introduced by the geometry of the high temperature plasma which is formed inside the bulb 12 when excited.

Accordingly, matching network 24 in FIG. 1 comprised of a pair of capacitors 26 and 28 which couple the excitation coil 14 between amplifier output terminal 30 and ground while in FIG. 2, which involves capacitive coupling, an inductor 32 is substituted for the capacitor 26.

As noted above the temperature of the plasma varies as a function of excitation. This in turn affects the tuning of the matching circuit 24 due to the fact that the resistance and reactance of the plasma comprise parameters of the tuning circuit. As such, they cause the optimum i.e. tuned frequency to shift as the bulb heats up. A typical frequency shift in tuning, as a function of plasma heating, is about 2%. Accordingly, in the subject invention, the frequency generated by the RF source 18 is swept over a 2% range of the selected operating frequency in a controlled manner by the sweep frequency controller 20 so as to cover the entire range of possible load match tuning conditions. Sweeping of the RF frequency of the source 18 over the tuning range drift results in the electrodeless bulb 12 being matched to the excitation frequency of the RF source 18 at some point in the sweep range at all times. As the characteristic curves 34, 36 and 38 of FIG. 3 indicate, as the excitation frequency varies over a range 40, the load impedance $|Z_{in}|$ varies above and below a plasma sustaining threshold 42. When the sweep range 40 is properly set, the result is that the bulb 12 becomes lighted by effectively being pulsed at a frequency that the bulb 12 and its matching circuit 24 want to operate. In between times, RF energy is normally reflected back to the source 18. Because of the persistence of the plasma, light output from the bulb 12 lags power input by a few milliseconds. By maintaining the sweep rate greater than the persistence of the eye, light variation or flicker in the output becomes imperceptible. A rate in the range of 240 Hz/sec. or greater has been found to satisfy the requirement.

In order to maintain an adequate average power to the bulb 12, the resultant power available from the RF source 18 must be increased from the normal steady state lamp operating power by an amount inversely proportional to the duty cycle imposed by the effective dwell time above the plasma sustaining threshold for its optimum matched condition.

A typical operating center frequency, at least for inductive coupling, is centered in the Industrial Scientific Medical (ISM) band at 27.12 MHz. At such a frequency, a two turn coupling coil 14 (FIG. 1) would be used. Higher frequencies, however, would permit the use of a single turn coil with less light blockage, while lower frequencies require an increase in the number of turns and more light blockage.

It should be noted that an additional benefit is derived from sweeping the frequency of the excitation RF signal in that it acts as an aid in starting the electrodeless bulb 12 because during the time that the instantaneous exciting frequency is not at the optimum frequency, higher than normal electric fields appear across the bulb. Although not conducive to normal sustained lighting, these fields nevertheless provide a supplemental ionizing potential for lamp starting in a manner which is similar to that provided by the ballast in a conventional fluorescent lamp fixture.

Thus what has been disclosed is a technique whereby the frequency of an RF source for an electrodeless light bulb is spread over a predetermined frequency bandwidth to ensure that optimum energy coupling to the bulb is achieved, irrespective of the frequency at which optimum matched conditions may exist.

Having thus shown and described what is at present considered to be the preferred embodiment of the invention, it should be noted that the same has been made by way of illustration and not limitation. Accordingly, all modifications, alterations and changes coming within the spirit and scope of the invention as set forth in the appended claims are herein meant to be included.

I claim:
1. An excitation circuit for an electrodeless lamp, including a light bulb containing an inert gas and one or more predetermined chemical elements, comprising:
   an RF signal source for generating an RF excitation signal for said light bulb;
   means for applying the RF excitation signal to said light bulb;
   means for varying the frequency of the RF excitation signal in a controlled manner; and
   an impedance matching network connected between said RF signal source and said means for applying the RF excitation signal to said light bulb, and wherein the frequency of the RF excitation signal is varied over a predetermined frequency range so as to substantially cover the entire range of possible load matching tuning conditions of said impedance matching network due to the fact that the temperature of a plasma generated in the bulb when excited varies as a function of excitation and has a resistance and reactance which comprise tuning parameters of the matching network.
2. An excitation circuit according to claim 1 wherein said means for varying the frequency of the RF excitation signal comprises a programmable frequency controller.
3. An excitation circuit according to claim 2 wherein said programmable frequency controller comprises a swept frequency controller.
4. An excitation circuit according to claim 1 wherein the frequency of the RF excitation signal is periodically swept over said predetermined frequency range.
5. An excitation circuit according to claim 4 wherein said frequency range is about 2% of the selected operating frequency of said RF signal.
6. An excitation circuit according to claim 5 wherein the frequency is centered at about 27.12 MHz.
7. An excitation circuit according to claim 4 wherein said RF excitation signal is swept in frequency at a rate wherein no perceivable flicker is discernable to the eye of a human being.
8. An excitation circuit according to claim 7 wherein the sweep rate is equal to or greater than about 240 Hz/sec.
9. An excitation circuit according to claim 1 wherein said means for applying the RF excitation signal to said light bulb comprises an inductive reactance or a capacitive reactance located in relatively close proximity to said light bulb.
10. An excitation circuit according to claim 1 and additionally including an amplifier circuit coupled between said RF signal source and said impedance matching network.
11. A method of exciting an electrodeless light bulb containing an inert gas and certain chemical elements comprising the steps of:
   generating an RF excitation signal for the electrodeless light bulb at a predetermined frequency;
   coupling the RF excitation signal to said electrodeless light bulb; and
   since a light emitting plasma having a resistance and a reactance is formed in the light bulb upon being excited and has a temperature which varies as a function of excitation, varying the frequency of said RF excitation signal in a controlled manner so that the bulb is matched to a source generating the RF excitation signal for substantially the entire range of load match conditions.
12. A method according to claim 11 wherein the step of varying the frequency of said RF excitation signal comprises the step of sweeping said frequency over a predetermined frequency range.

13. A method according to claim 12 wherein the step of sweeping comprises sweeping the frequency about said predetermined frequency.

14. A method according to claim 13 wherein said frequency range comprises about 2% of said predetermined frequency.

15. A method according to claim 12 wherein said step of sweeping includes sweeping at a predetermined sweep rate.

16. A method according to claim 15 wherein said sweep rate comprises a rate wherein flicker of the light emitted by said bulb is substantially imperceptible to the human eye.

17. A method according to claim 16 wherein said sweep rate is equal to or greater than about 240 Hz/sec.

18. A method according to claim 11 and additionally including the step of amplifying the RF excitation signal prior to said coupling step.

19. An excitation circuit for an electrodeless lamp, including a light bulb containing an inert gas and one or more predetermined chemical elements, comprising:

an RF signal source for generating an RF excitation signal for said light bulb;

a circuit element for applying the RF excitation signal to said light bulb;

a controller for varying the frequency of the RF excitation signal in a controlled manner; and an impedance matching network connected between said RF signal source and said means for applying the RF excitation signal to said light bulb, and wherein the frequency of the RF excitation signal is varied over a predetermined frequency range so as to substantially cover the entire range of possible load matching tuning conditions of said impedance matching network due to the fact that the temperature of a plasma generated in the bulb when excited varies as a function of excitation and has a resistance and reactance which comprise tuning parameters of the matching network.

20. An excitation circuit according to claim 19 wherein said controller for varying the frequency of the RF excitation signal comprises a programmable frequency controller and wherein the frequency of the RF excitation signal is periodically swept over said predetermined frequency range.

* * * * *